United States Patent [19]

Hager

[11] Patent Number: 5,504,405
[45] Date of Patent: Apr. 2, 1996

[54] SWITCH MACHINE CONTROLLER WITH FAIL SAFE MECHANISM

[75] Inventor: Mark Hager, Rochester, N.Y.

[73] Assignee: General Railway Signal Corporation, Rochester, N.Y.

[21] Appl. No.: 293,155

[22] Filed: Aug. 19, 1994

[51] Int. Cl.$^6$ .................................... H01R 39/46
[52] U.S. Cl. .................... 318/439; 318/254; 318/138; 318/807
[58] Field of Search .................................. 318/254, 439, 318/138, 807

[56] References Cited

U.S. PATENT DOCUMENTS

| | | | |
|---|---|---|---|
| 4,147,939 | 4/1979 | Russell | 318/254 |
| 5,151,017 | 9/1992 | Sears et al. | 318/807 |

*Primary Examiner*—William M. Shoop, Jr.
*Assistant Examiner*—Karen Masih
*Attorney, Agent, or Firm*—Ohlandt, Greeley, Ruggiero & Perle

[57] ABSTRACT

A switch machine controller for providing fail safe control of a switch machine, having a motor for actuating the movements of a railroad switch, said motor being a brushless D.C. motor having a permanent magnet structure and a plurality of independent field coils. The controller has control circuitry for energizing and de-energizing field coils of said motor sequentially as the armature rotates. Further the controller, including a motor driver arrangement for switching a first service of power sequentially to said field coil of said motor, switches machine control lines connected to second source of power. Also, an amplifier for controlling timing signals which, in turn, controls the motor driver, thus receiving its power only from said switch machine control lines, and can only generate the proper sequence of signals when the control lines are energized, such that the motor can only run when the control lines are energized.

8 Claims, 2 Drawing Sheets

SWITCH MACHINE CONTROLLER WITH FAIL SAFE MECHANISM

BACKGROUND OF THE INVENTION

A requirement for the operation of a railroad is the ability to switch trains from one track to another. A common method of providing a switching capability is to install an electric motor driven switch machine adjacent a pair of stock rails for the purpose of actuating appropriate switch points.

A device that is used in connection with the aforesaid switch machine is a controller that must be fail safe. Fail safe, as used in the signaling context, means that no failure will cause the system to be less safe than it would be if the failure had not occurred. That is, a failure will leave the system at safe as it was before the occurrence of the failure. In connection with the switch machine that relies on the operation of a motor that actuates the rail switch, in order for the motor to be safe, it must not be turned on at the wrong time. For example, if the motor uses a transistor as a power switch and the transistor shorts out due to a shortage, the motor cannot be allowed to turn on. The same holds true for the control lines on the aforesaid motor controller. If there are transistors or transistor junctions used as switches on the control lines and one of them shorts out, the motor again cannot be allowed to run. Any failure mode of any part of the circuitry cannot cause the motor to operate. This includes transistor junctions shorting, opening or shorting to ground.

Accordingly, it will be understood that a failure, or a combination of failures, must not cause or permit the motor to operate without the presence of proper control signals. In many cases, a failure will prevent motor operation but this does not pose a problem.

Moreover, it is a primary object of the present invention to achieve fail-safe operation for a railroad machine.

The present invention recognizes that by a judicious selection of a switch machine controller combined with a brushless D.C. motor, operable for actuating the rail switch, a fail safe operation can be realized.

As is known, a brushless D.C. motor has a permanent magnet armature and several independent field coils. There is also control circuitry involved with the D.C. power being applied, that is, control circuitry for energizing and de-energizing the coils sequentially. As the coils are thus properly energized, the armature is rotated.

SUMMARY OF THE INVENTION

In order to fulfill the above and other objects, a primary feature of the present invention includes a motor driver means consisting of one driver for each motor field coil, that is, each driver switches power sequentially to its motor field coil. Energy for operating the motor, that is, typically a 110 voltage supply, must always be present at the motor driver means. If any or all of the individual drivers shorts out, the field coil associated with the damaged driver could in that event be energized, but it would not be de-energized at the appropriate time. Hence, the motor would stop running. A second component of the controller means is an amplifier. This device controls the timing signals that in turn control the motor driver means. The amplifier thus controls the direction and speed of the motor. Fundamental to the concept of the present invention of this application is that the amplifier receives its power only from the switch machine control lines. This concept will be fully explained as the description proceeds. It should be noted that the amplifier can only generate the proper sequence of signals to be applied to the motor driver means when the control lines are energized; therefore, the motor can only run when the control lines are energized.

In order to provide isolation so as to prevent the motor power from energizing the amplifier, isolation means in the form of magnetic or opto-coupling between the amplifier and the motor driver means is provided.

Other and further objects advantages and features of the present invention will be understood by reference to the following specification in conjunction with the annexed drawings, wherein like parts have been given like numbers.

DESCRIPTION OF PREFERRED EMBODIMENT

Figure 1:
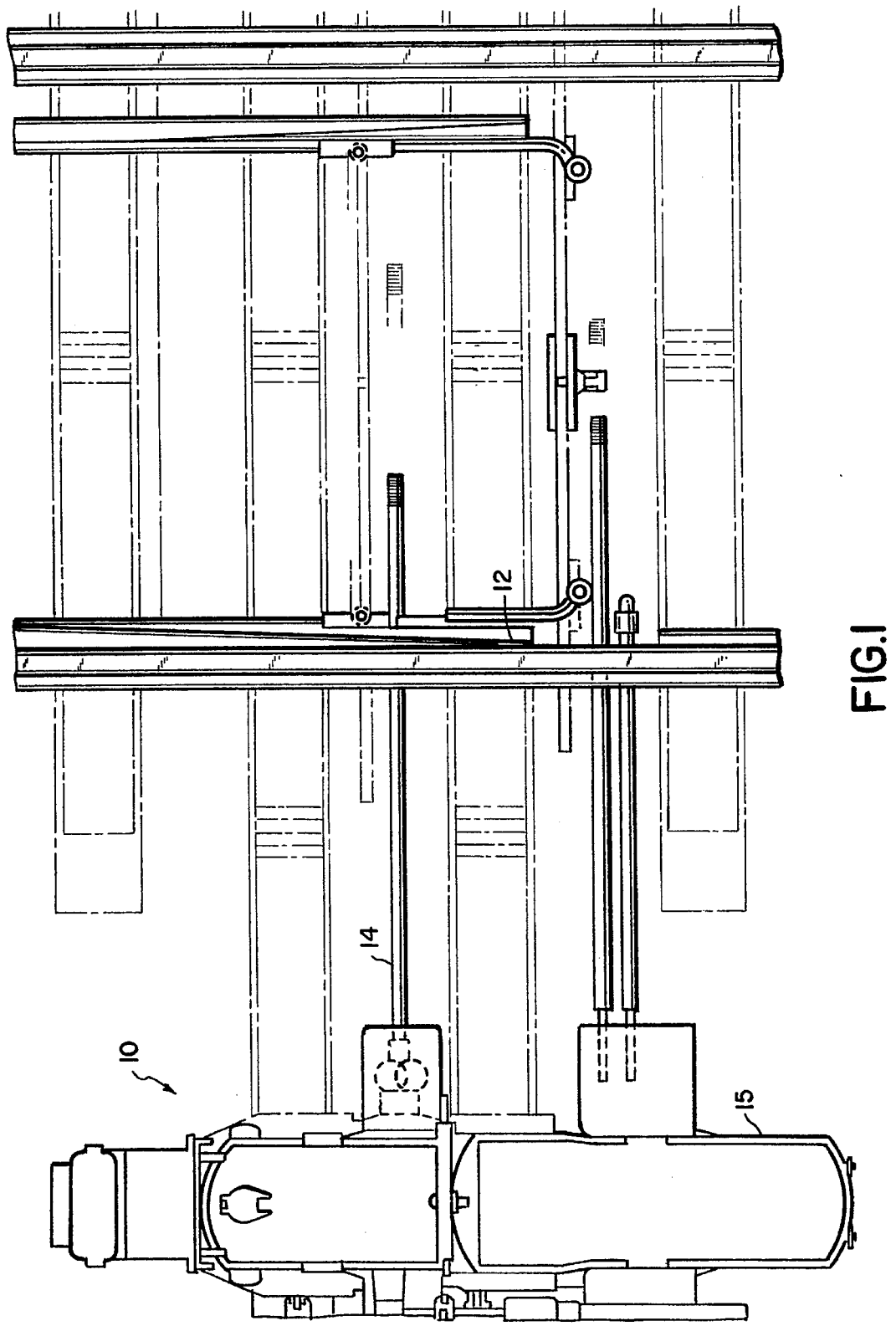
FIG. 1 is an overview of the switch machine environment in which invention is incorporated.
Figure 2:
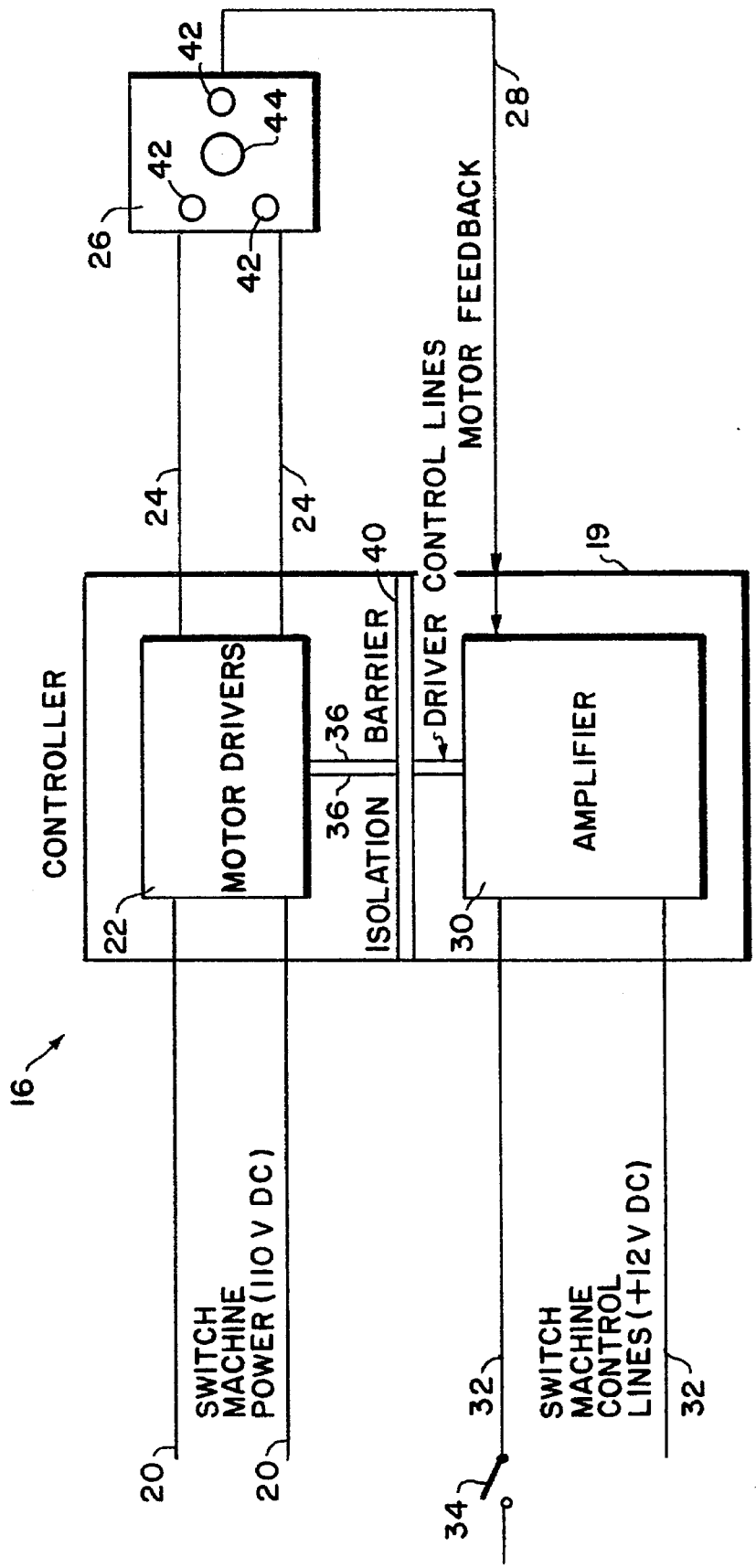
FIG. 2 is a schematic diagram of the fail safe switch machine control system of the present invention.

Referring now to figures of the drawing, there will be seen in FIG. 1 a switch machine 10 adapted to throw switch points 12 associated with standard rails by means of throw rod 14. FIG. 2 depicts the fail-safe switch machine control system 16. It will be understood that this control system is housed within the housing 15 for the switch machine, per se well known in the art. The controller 19 is supplied with conventional 110 volt D.C. power on the lines 20 connected to the input of motor driver means 22. At the output of the motor driver means a pair of lines 24 connects to a brushless motor 26 of conventional construction which includes, for example, three field coils 42.

Also provided is a motor feedback means 28 for regulating in a well known manner the input supply to the brushless motor 26, such motor feedback being fed to amplifier 30 also forming part of the controller device 19. The brushless motor 26, includes a permanent magnet rotor 44. Connected to the amplifier means 30 at its input are control lines 32 over which, typically, plus 12 volts D.C. are supplied to the amplifier means. This plus 12 volts supply is only present, by reason of closure of switch means 34, when the throw switch on the switch machine is being activated, that is, when actual movement of the switch points on the railroad tracks are being effectuated. Of course, this plus 12 volts is applied to all components within the amplifier means; otherwise the components receive no power.

Timing signals are conveyed by the lines 36 from the amplifier means 30 to the motor driver means 22, An isolation barrier 40 is interposed along the lines, that is, instead of a straight connected path, magnetic or opto-coupling is interposed. The reason for this is that 110 volt D.C. power supply being normally supplied to the motor driver means cannot connect with the amplifier means, that is, there is no conductive pathway; hence, 110 volt D.C. power is precluded from energizing the amplifier means.

The invention having been thus described with particular reference to the preferred forms thereof, it will be obvious that various changes and modifications may be made therein without departing from the spirit and scope of the invention as defined in the appended claims.

I claim:

1. A switch machine controller for providing fail safe control of a switch machine comprising:

a motor for actuating movements of a railroad switch, said motor being a brushless D.C. motor having a permanent magnet structure and a plurality of independent field coils;

a controller having control circuitry for energizing and de-energizing said field coils of said motor sequentially whereby the armature thereof is rotated;

said controller including a motor driver means for switching power sequentially to said field coils;

control lines energized by a power source only when said switch machine is being activated;

amplifier means, connected to said control lines, for controlling timing signals that, in turn, control the motor driver means, said amplifier means receiving its power only from said control lines, whereby said amplifier means can only generate the proper sequence of signals when said control lines are energized and the motor can only run when said control lines are energized.

2. The switch machine controller of claim 1, further comprising isolation means for preventing power for the motor from energizing said amplifier means.

3. A switch machine controller for providing fail safe control of a railway switch comprising:

a motor for actuating movements of the railway switch;

a controller including motor driver means connected to said motor for energizing and de-energizing said motor, and amplifier means conductively isolated from said motor driver means for communicating timing signals to said motor driver means;

a power line connected to said motor driver means for supplying said motor driver means with electrical power to energize and de-energize said motor; and a control line connected to said amplifier for controlling communication of said timing signals to said motor driver means, wherein said amplifier means receives power only from said control line and said motor runs only when said control line is energized.

4. The switch machine controller of claim 3, wherein said motor is a brushless D.C. motor.

5. The switch machine controller of claim 4, wherein said brushless D.C. motor has a permanent magnet structure and a plurality of independent field coils.

6. The switch machine controller of claim 3, wherein said controller includes an isolation means for preventing power for said motor from activating said amplifier means.

7. The switch machine controller of claim 3, wherein said amplifier means communicates to said motor driver means via magnetic means.

8. The switch machine controller of claim 3, wherein said amplifier means communicates to said motor driver means via opto-coupling means.

* * * * *